(12) United States Patent
Ur

(10) Patent No.: US 9,319,453 B2
(45) Date of Patent: Apr. 19, 2016

(54) USER-CONTROLLED DOWNLOAD DURATION TIME

(76) Inventor: Shmuel Ur, Shorashim (IL)

( * ) Notice: Subject to any disclaimer, the term of this patent is extended or adjusted under 35 U.S.C. 154(b) by 955 days.

(21) Appl. No.: 13/183,461

(22) Filed: Jul. 15, 2011

(65) Prior Publication Data

US 2013/0060904 A1    Mar. 7, 2013

(51) Int. Cl.
| | |
|---|---|
| G06F 15/16 | (2006.01) |
| G06F 3/01 | (2006.01) |
| H04L 29/08 | (2006.01) |
| H04L 12/851 | (2013.01) |
| H04L 12/869 | (2013.01) |
| H04W 4/00 | (2009.01) |
| H04L 29/06 | (2006.01) |

(52) U.S. Cl.
CPC ............... *H04L 67/06* (2013.01); *H04L 47/24* (2013.01); *H04L 47/58* (2013.01); *H04L 67/325* (2013.01); *H04W 4/001* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 6,377,996 | B1 * | 4/2002 | Lumelsky et al. | 709/231 |
| 7,337,231 | B1 * | 2/2008 | Li | 709/231 |
| 7,679,637 | B1 * | 3/2010 | Kohler | 348/14.01 |
| 7,797,723 | B2 * | 9/2010 | Demircin et al. | 725/143 |
| 7,818,444 | B2 * | 10/2010 | Brueck et al. | 709/231 |
| 7,840,693 | B2 * | 11/2010 | Gupta et al. | 709/232 |
| 8,270,473 | B2 * | 9/2012 | Chen et al. | 375/240.03 |
| 8,396,114 | B2 * | 3/2013 | Gu et al. | 375/240.01 |
| 8,601,153 | B2 * | 12/2013 | Choudhury et al. | 709/236 |
| 8,892,691 | B2 * | 11/2014 | Pantos et al. | 709/219 |
| 9,032,465 | B2 * | 5/2015 | Perlman et al. | 725/114 |
| 2002/0065925 | A1 * | 5/2002 | Kenyon et al. | 709/231 |
| 2002/0101880 | A1 * | 8/2002 | Kim | 370/465 |
| 2002/0194310 | A1 * | 12/2002 | Chu et al. | 709/219 |
| 2003/0163478 | A1 * | 8/2003 | Kirkland | G06F 17/30144 |
| 2004/0111756 | A1 * | 6/2004 | Stuckman | H04N 5/782 |
| | | | | 725/142 |
| 2005/0254427 | A1 * | 11/2005 | Leon et al. | 370/235 |
| 2006/0126713 | A1 * | 6/2006 | Chou et al. | 375/225 |

(Continued)

OTHER PUBLICATIONS

Rusen, Ciprian. "Managing Downloads in Internet Explorer 9." Aug. 6, 2011.*

(Continued)

*Primary Examiner* — Scott B Christensen
*Assistant Examiner* — Lam Do
(74) *Attorney, Agent, or Firm* — The Law Office of Joseph L. Felber

(57) ABSTRACT

A method, apparatus and computer program product useful for communicating media content, over a computerized network, in accordance with download duration time. One exemplary method may comprise obtaining a download duration time from a client with respect to a media content; determining a quality of the media content so as to be provided within the download duration time; and transmitting to the client a version of the media content having the quality. Another exemplary embodiment may be a computer program product for enabling a user of a client to select download duration time, the computer program product comprising: program code stored on a non-transitory computer readable medium; wherein the program code is operative to display a Graphical User Interface (GUI) widget on a display of the client, wherein the GUI widget comprises: a download duration time input component, wherein the GUI widget is operative to provide the download duration time to a content delivery apparatus for providing a media content within the download duration time.

18 Claims, 4 Drawing Sheets

(56) References Cited

U.S. PATENT DOCUMENTS

| | | | |
|---|---|---|---|
| 2007/0162611 A1* | 7/2007 | Yu et al. | 709/232 |
| 2008/0133766 A1* | 6/2008 | Luo | 709/231 |
| 2008/0192820 A1* | 8/2008 | Brooks | H04N 7/17318 375/240.02 |
| 2008/0235360 A1* | 9/2008 | Li et al. | 709/223 |
| 2010/0100899 A1* | 4/2010 | Bradbury | H04N 7/17318 725/29 |
| 2010/0199318 A1* | 8/2010 | Chang | H04N 7/17318 725/97 |
| 2012/0210216 A1* | 8/2012 | Hurst | 715/716 |
| 2012/0254456 A1* | 10/2012 | Visharam et al. | 709/231 |
| 2012/0324122 A1* | 12/2012 | Miles et al. | 709/231 |
| 2013/0007297 A1* | 1/2013 | Soroushian | H04L 65/4084 709/231 |

OTHER PUBLICATIONS https://www.internetdownloadmanager.com/support/idm-scheduler/idm_scheduler.html, Apr. 6, 2008.*

* cited by examiner

USER-CONTROLLED DOWNLOAD DURATION TIME

TECHNICAL FIELD

The present disclosure relates to communication in general, and to transmitting of media streams, in particular.

BACKGROUND

With the increasing popularity of playing streaming audio and video over networks such as the Internet, there is plurality of methods to provide media streams to clients over networks.

A media stream comprises of multimedia data, such as images, video, audio or the like. A media stream may be downloaded in a streamlining manner. Additionally or alternatively, the media stream may be downloaded in a non-streaming manner, such as by downloading a file comprising the media stream.

Media streams may be compressed using lossy compression techniques so to reduce their size. Lossy compression techniques remove information from the media stream, thus reducing the quality thereof, but enabling a faster transmission of the media stream.

U.S. Patent Publication 2010/0,189,183 entitled "MULTIPLE BIT RATE VIDEO ENCODING USING VARIABLE BIT RATE AND DYNAMIC RESOLUTION FOR ADAPTIVE VIDEO STREAMING" to Gu et al, which is hereby incorporated by reference, discloses a-priori compression of a media content into plurality of alternative qualities, and enabling switching therebetween during streaming of the media content, based on network conditions.

A user may potentially chose a between different compression versions of the same media stream, such as between a media stream of High Definition (HD) quality and between a Standard Definition (SD) quality. The decision of the user may be based on the different network conditions, and in particular download rate, and on a desired quality of the media stream. The user's decision is a-priori prior to downloading the media stream.

BRIEF SUMMARY

One exemplary embodiment of the disclosed subject matter is a computer-implemented method comprising: obtaining download duration time from a client with respect to a media content; determining a quality of the media content so as to be provided within the download duration time; and transmitting to the client a version of the media content having the quality.

Another exemplary embodiment of the disclosed subject matter is an apparatus, the apparatus comprising: a processing unit adapted to: obtain a download duration time from a client with respect to a media content; determine a quality of the media content so as to be provided within the download duration time; and to transmit to the client a version of the media content having the quality.

Yet another exemplary embodiment of the disclosed subject matter is a computer program product for enabling a user of a client to select download duration time, the computer program product comprising: program code stored on a non-transitory computer readable medium; wherein the program code is operative to display a Graphical User Interface (GUI) widget on a display of the client, wherein the GUI widget comprises: a download duration time input component, wherein the GUI widget is operative to provide the download duration time to a content delivery apparatus for providing a media content within the download duration time.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
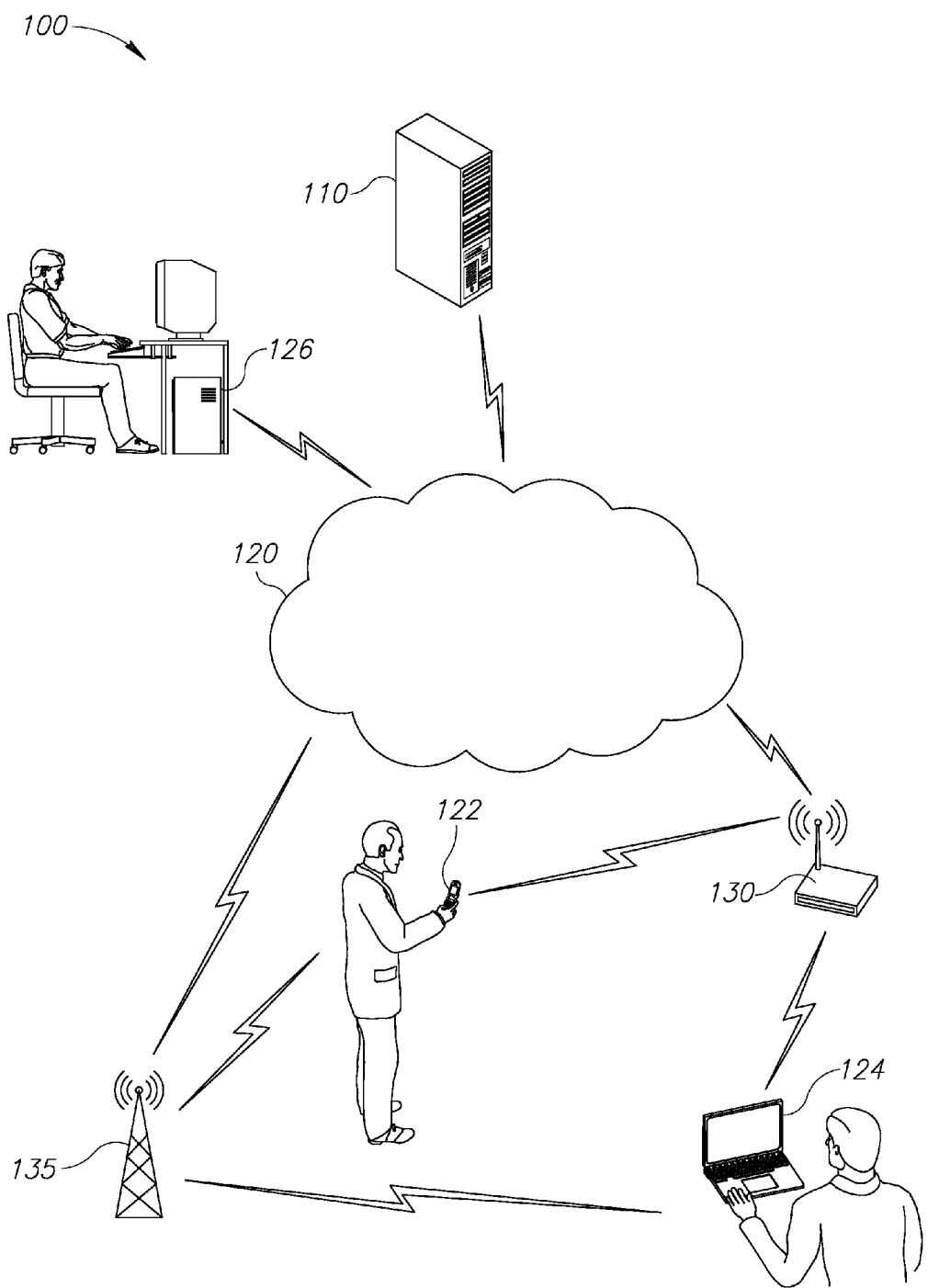
FIG. 1 shows a computerized environment, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to enable a user to better control downloading of media content.

Another technical problem dealt with by the disclosed subject matter is to enable the user to determine a time by which download be completed.

Yet another technical problem dealt with by the disclosed subject matter is to enable the user to change parameters effecting download speed and/or quality of media content during the downloading process.

A technical solution is to obtain from a client a download duration time for a given media content. Based on the duration time, a version of the media content may be selected. The version may be selected from a predetermined set of different versions having different quality. Additionally or alternatively, the version may be compressed on-the-fly using an appropriate compression method, such as a lossy compression method.

In some exemplary embodiments, transmission rate to the client may be determined (e.g., 100 Kb/sec) and based thereof a maximal amount of data that can be transferred during the download duration time may be determined. According to the maximal amount of data the version of the media content may be selected.

Another technical solution is to continuously monitor the transmission rate and modify the version being downloaded accordingly. The media content may be segmented into several segments, each segment may be downloaded from a different version, thereby the downloaded media content may have a variable quality at different segments thereof. Before initiating download of a next segment, the version may be selected in accordance with remaining time.

Additionally or alternatively, the client may provide an indication from the user to change the download duration time. In some exemplary embodiments, a different time may be provided. Additionally or alternatively, the user may indicate he would like the media content to be downloaded faster or slower, thereby changing quality of the downloaded version by a one unit with respect to a predetermined quality granule. Based on the user's indication, the version may be selected.

Yet another technical solution is to provide an indication to the user of the client upon change in its connectivity, such as when switching between a WiFi connection and a cellular data connection. The user may respond to the indication and change the size of the downloaded file (e.g., by changing the quality, changing the download duration time, or the like).

One technical effect of utilizing the disclosed subject matter is to enable a user to indicate his wish that the download would be completed sooner, without loss of data that was downloaded so far.

Another technical effect is to enable a user to indicate a desired time to view the media content, and download the media content in substantially the highest possible quality that would be downloaded by the desired time.

Yet another technical effect is to enable the user to better control his budget, as different network connections may be associated with different usage costs, which may depend on bandwidth utilization.

Yet another technical effect is to enable a user to control download speed at the expense of quality. Additionally, the control may be in a dynamic manner.

It will be noted that the disclosed subject matter related to transmission of data from one computerized device to another. The present disclosure focuses on a scenario in which a client, being used by a user, downloads media content from a server. However, the disclosed subject matter is not limited to this scenario and may apply to uploading of data from the client to the server, transmittal of media content from one user device to another user device, or the like. The "client" is therefore a computerized device that is operative to receive the media content.

In the present disclosure the term "download" refers to receiving data by a computerized device from a source over a computerized network. Thus, a server may be said to download data from a client, a first client may "download" data from a second client, or the like.

Referring now to FIG. 1 showing a computerized environment, in accordance with some exemplary embodiments of the disclosed subject matter. A computerized environment 100 may comprise a computerized network 120, such as a Local Area Network (LAN), a Wide Area Network (WAN), an intranet, the Internet, or the like, connecting directly or indirectly one or more computerized devices. Devices, such as 110, 122, 124, 126, may be connected to network 120 using a wired connection, a wireless connection, or the like.

A Content Delivery Network (CDN) 110 may be a computerized server operative to service content, such as media content. Media content may be video, audio, images, or the like. Media content may be compressed using lossy compression.

Lossy compression is a data encoding method which compresses data by discarding (losing) some of it. The procedure aims to minimize the amount of data that need to be held, handled, and/or transmitted by a computer. Typically, a substantial amount of data can be discarded before the result is sufficiently degraded to be noticed by the user. Furthermore, different loss rates may be utilized depending on a manner in which the media content is to be viewed. For example, in case of a video, if the video is to be displayed on a screen having a relatively low resolution, a relatively high loss rate may be used. On the other hand, if a HD display is used, a relatively low loss rate should be applied in order for a user not to notice the degraded quality.

A client 126, such as a personal computer, may be connected to network 120. A user of client 126 may utilize client 126 in order to download media content from CDN 110 and view the media content. The media content may be viewed in a streaming manner or in a non-streaming manner. As an example, the media content may be downloaded in a digital file from CDN 110 and viewed by a video player comprised by client 126. As another example, the media content may be streamed from CDN 110, such as the popular YouTube® service, and viewed using an appropriate player, such as a web-applet flash player.

A client 122 may be a mobile phone, a smartphone, an embedded device, a Personal Digital Assistant (PDA), or the like. Client 122 may be connected to network 120 in a wireless manner, a wired manner, or the like. Similarly, client 124 may be a computerized portable device, such as a laptop, a tablet computer, an e-book reader, or the like. Client 122 and/or client 124 may be connected to the network 120 via a network connection.

In one occasion the network connection may be a wireless router 130, such as for example a WiFi router. Wireless router 130 may be associated with a residential network of a user, with an office network, with a publicly available network, or the like. In a different occasion, the network connection may be via a cellular network 135. In some exemplary embodiments, client may switch between different network connections based on accessibility, available bandwidth, financial costs, or the like.

In some exemplary embodiments, there may be a fee charge for connecting via a network connection such as wireless router 130 and cellular network 135. In some exemplary embodiments, the fee may be based on bandwidth utilization. In some exemplary embodiments, there may be a different costs associated with connecting via wireless router 130 and cellular network 135, so that a user may have a preference therebetween based on costs. Additionally or alternatively, different network connections may provide different bandwidths (e.g., 100 Mb/sec via wireless router 130 and 1 Mb/sec via cellular network 135) and thus a user may have a preference therebetween based on the bandwidth.

A user utilizing a client, such as clients 122, 124, 126, may utilize an input device, such as a keyboard, a pointing device, a touch screen, a touch pad, or the like.

A user utilizing a client, such as clients 122, 124, 126, may decide to obtain a media content, such as from CDN 110. The user may determine a time duration in which the media content should be downloaded and ready to be viewed (e.g., watching the movie, listening to the music, or the like). The duration time may be provided as time needed for downloading (e.g., within 5 minutes). Additionally or alternatively, the duration time may be provided as time by which the downloading will be finished (e.g., by 17:25).

In some exemplary embodiments, a user may indicate that the time duration is changed after downloading has commenced. CDN 110 may be notified of the change and accordingly change the version being transmitted to the client. For example, consider a movie clip. An SD version of the movie clip is of size 100 MB, and an HD version of the movie clip is of size 200 MB. Given a connection of 1 MB/sec, the SD version can be downloaded within 100 seconds, while the HD version can be downloaded within 200 seconds. Assuming initially we had only 100 seconds, and therefore the SD version was transmitted. After 50 seconds, the user may change the remaining time from additional 50 second to 100 seconds. The remaining time is enough to complete downloading the second half of the movie clip in its HD version, and therefore CDN 110 continues transmitting the content, but provides the HD version. After the downloading ends, the client retains a version of the media content having two portions: the first portion in SD quality and the second portion in HD quality.

In some exemplary embodiments, based on changes in communication link, network connection, bandwidth utilization, or the like, transmission rate between CDN 110 and the client may change. Based on the change, the version being transmitted may be changed to a version having higher/lower quality.

In some exemplary embodiments, CDN 110 may dynamically encode the media content using a lossy compression method in a dynamic manner so as to provide the client with a version adapted to its requirements (e.g., download duration time). In some exemplary embodiments, there may be different levels of "lossiness" to each method, and CDN 110 determines an appropriate one that will produce a media content version that can be transferred within the provided duration time. Additionally or alternatively, the CDN 110 may retain pre-prepared version of the media content using different lossiness levels, and therefore different size. The CDN 110 may determine which of the versions to send to the client based on the duration time.

Figure 2:
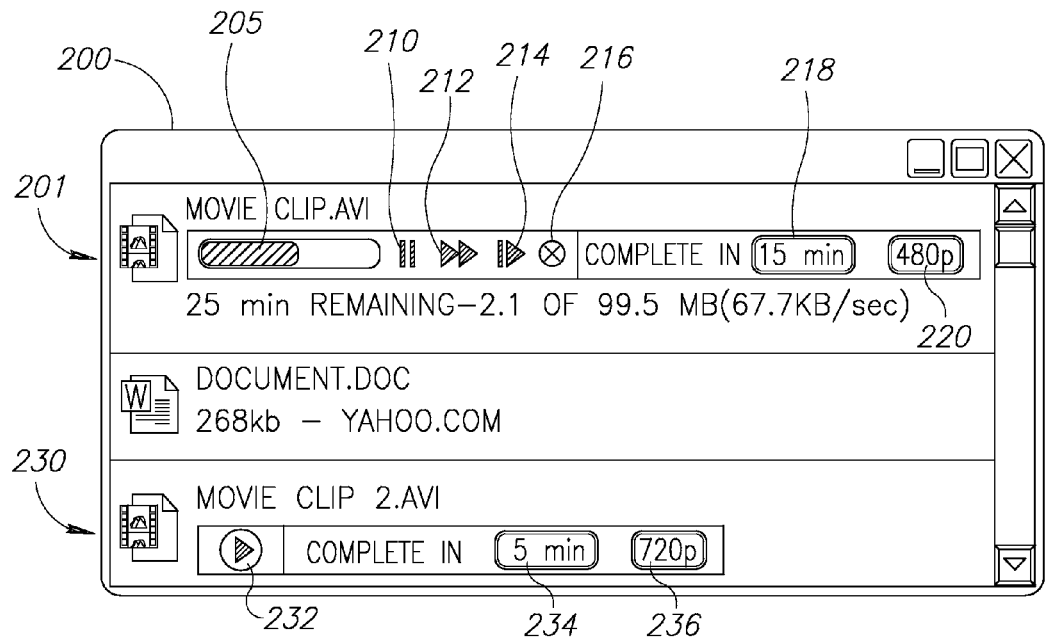
FIG. 2 shows a download widget, in accordance with some exemplary embodiments of the disclosed subject matter.

Referring now to FIG. 2 showing a download widget, in accordance with some exemplary embodiments of the disclosed subject matter. A download widget 200 may display files being downloaded, files that are about to be downloaded and/or files that were previously downloaded.

Entry 201 shows a file named "movie clip.avi" being downloaded. The file is a media content.

An input component 218 may be used by a user to determine a download duration time. For example, if 15 min is selected, and as under current transmission rate (67.7 KB/sec) the remaining data to be transferred (97.4 MB) would be downloaded within more than 15 minutes, the remaining portion of the media content may be downloaded with a reduced quality. Input component 218 may be responsive for setting an initial download duration time (either before downloading is commenced or afterwards) and for changing thereof. Input component 218 may be responsive to user input interaction. In some exemplary embodiments, if no user input is entered, input component 218 may initially indicate current estimated time of download (e.g., in the example of FIG. 2—25 min). In some exemplary embodiments, there may be a predetermined time granule units, such as a minute, half a minute, or the like, so that the user may enter duration that is measured using the time granule units (e.g., 10.5 minutes but not 10.7 minutes).

Additionally or alternatively, input component 218 may be utilized to indicate a time by which downloading is to be finished (e.g., 18:23).

A Quality Control Component (QCC) 220 may be operative to display an indication of current quality of the downloaded media content. For example, an indication of a resolution of a video (e.g., 480 p, 800×600, or the like), a bit rate of media content, a lossiness level of media content or the like. In some exemplary embodiments, the indication may be provided to indicate to a user in a non-technical manner the quality, such as, for example, by indicating whether the video can be viewed using large screen HDTV, regular TV set, a mobile device, or the like.

QCC 220 may be responsive to user input and may be operative to switch between different versions of the media content, in accordance with the disclosed subject matter. In some exemplary embodiments, in response to a user clicking QCC 220, a list of possible alternative qualities may be displayed and a user may select a desired quality. The list may be based on predetermined set of versions retained by the CDN. Additionally or alternatively, the list may be populated based on current received quality and based on a granule quality unit, such that several better and worse versions can be selected (e.g., if current version is 420 p, 720 p and 1080 p may be displayed as two better versions, and 320 p and 200 p may be displayed as versions having worse quality). In response to an interaction with QCC 220, a command to the CDN to switch a version based on the quality selection may be transmitted and the downloaded version may be switched to a version having substantially the selected quality. It will be understood that the quality levels may be estimation only useful as an indicative measurement to the user.

A progress bar 205 may be operative to display a portion of the media content that was downloaded. It will be noted that in non-streaming downloading methods, the packets of the media content that are downloaded may not necessarily be consecutive, and may be sporadically distributed.

A pause button 210 may be responsive to user input and may be operative to pause downloading of the media content. Thereafter, a resume button (not shown) may be displayed enabling the user to indicate that downloading should be resumed. Pause and resume of media content downloading may cause the client, such as 122, to indicate to CDN, such as 110, the determined action, and the CDN may act accordingly.

A Fast Forward (FF) button 212 may be response to user input and may be operative to cause downloading to be completed sooner. In response to an interaction by the user with FF button 212, the client may send an indication to the CDN to reduce quality of the media content, thereby reducing size of remaining data to be downloaded. In some exemplary embodiments, FF button 212 may be operative to decrease the time duration by one time unit. Additionally or alternatively, FF button 212 may be operative to decrease quality of the media content by one unit. The determination of the version to be sent to the client may be performed by the CDN based on receiving an updated time in response to interacting with FF button 212, based on receiving an updated quality in response to interacting with the FF, or the like. Additionally or alternatively, in response to interacting with the FF button 212, a command to the CDN indicating that the button was pressed may be sent, and the CDN may modify the version accordingly based on predetermined preferences.

In some exemplary embodiments, FF button 212 may be disabled in case there is no possibility to further reduce the quality. In some exemplary embodiments, a provider of media content may determine a minimal quality threshold and may not allow the media content to be downloaded in a quality below the minimal quality threshold.

Similarly to FF button 212 there may be a Slow Motion (SM) button 214. SM button may be responsive to user input and may be operative to cause downloading to be completed later, but with better quality. In some exemplary embodiments, SM button 214 may be disabled in case a version of highest available quality is being downloaded. In some exemplary embodiments, SM button 214 may be disabled in case the media content being downloaded is compressed in a lossless rate or is not compressed at all.

In some exemplary embodiments, FF button 212 and SM button 214 may be disabled in case the downloaded data is not media content or in case the CDN does not support dynamic modification of the loss rate of lossy compression encoding utilized and/or changing a version being sent to a version of different quality, in accordance with the disclosed subject matter.

A cancel button 216 may be responsive to user input and may be operative to cancel downloading.

Entry 230 shows a file named "movie clip 2.avi" that can be downloaded. The file is a media content. In some exemplary embodiments, a commence button 232 may be responsive to user input and may be operative to cause downloading to commence. In some exemplary embodiments, input component 234, similar to input component 218, and/or a QCC 236, similar to QCC 220, may be utilized to determine initial download duration time or quality of the downloaded media content. Based on selections by user a version to be downloaded may be determined and downloading thereof may begin in response to interacting with commence button 232.

Download widget 200 may be utilized in downloading non-media content, such as for example a document file. Optionally, QCC 220/236, input component 218/234, FF button 212 and SM button 214 may not be displayed with respect to downloading of non-media content. Alternatively, the components may be displayed but may be disabled in such cases.

In some exemplary embodiments, download widget 200 may be operative to notify the user (e.g., using a popup window, an alert, or similar indication) that network status has changed, and may invite the use to select a different quality, download duration time, or the like. For example, in case there the network connection has changed to a faster network connection, cheaper network connection or the like an alert may be issued. As another example, in case the transmission rate is changed for the better or for the worse, an indication may be provided. Optionally, indications may be provided when substantial change occur (i.e., change above a predetermined delta, where the delta may be absolute or a proportion).

Figure 3:
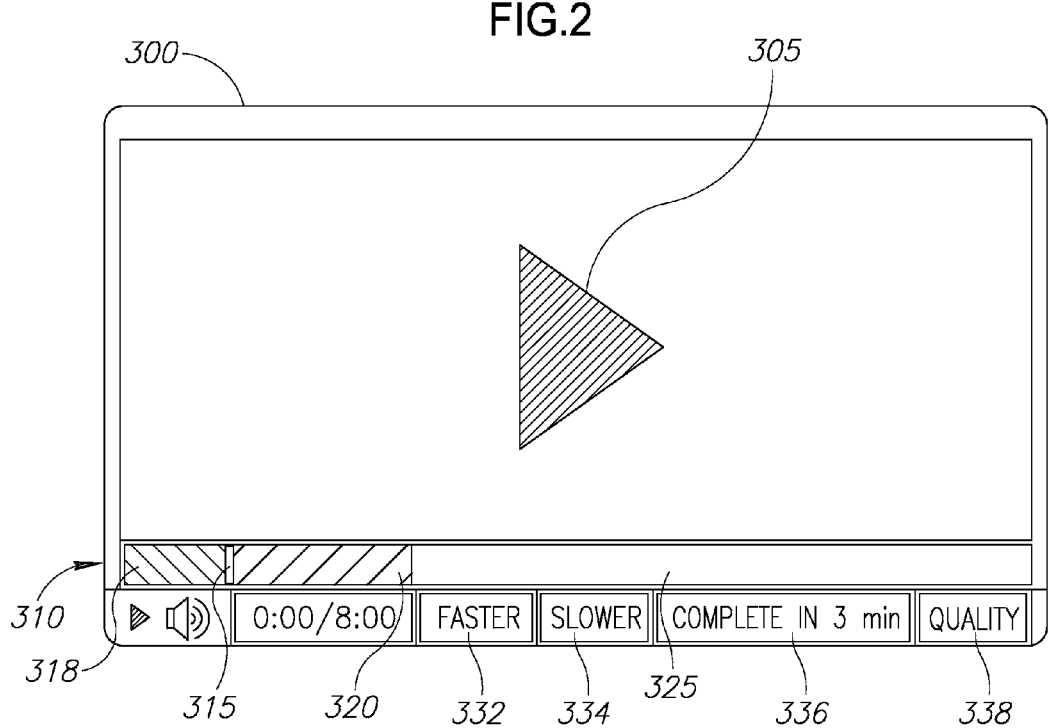
FIG. 3 shows a streaming viewer widget, in accordance with some exemplary embodiments of the disclosed subject matter.

Referring now to FIG. 3 showing a streaming viewer widget, in accordance with some exemplary embodiments of the disclosed subject matter. A widget 300 may be operative to download and display media content in a streaming manner. Widget 300 may be a part of a software tool, such as a player, may be embedded within a website, such as a client-side player applet, or the like.

Display 305 may be utilized to display the media content in case the media content is of video. Otherwise, display 305 may be disabled or absent. In some exemplary embodiments, in case the media content is not being watched the display may be used as an interactive component to resume playing of the media content.

A progress bar 310 may be utilized to indicate a portion of the media content that was downloaded and a portion that is yet to be downloaded (portion 325). In some exemplary embodiments, the portion that was downloaded may be split into a first portion that was played (318) and a second portion that was not yet played (320).

A location indicator 315 may indicate current location of the media content being displayed. In FIG. 3, in response to resuming playback of the media content, portion 320 will be shown.

Similarly to download widget 200, there may be component operative to control download duration time (input component 336, such as 218 of FIG. 2), quality of media content (QCC 338, such as 220 of FIG. 2; FF button 332, such as 212 of FIG. 2; SM button 334, such as 214 of FIG. 2).

In some exemplary embodiments, in response to changing quality of media content being downloaded, additional data that will be downloaded (e.g. with respect to portion 325 of the media content) may be downloaded in the modified quality.

In some exemplary embodiments, progress bar 310 may operative to indicate downloaded portions of different quality, such as by utilizing different color, a different pattern, or other visual indications.

It will be noted that in some exemplary embodiments, in case portion 325 is downloaded with a different quality than portions 318, 320, when the media content is played back from the beginning, the played media content may have two different qualities: a first quality when playing portions 318, 320 and a second quality when playing portion 325.

Figure 4:
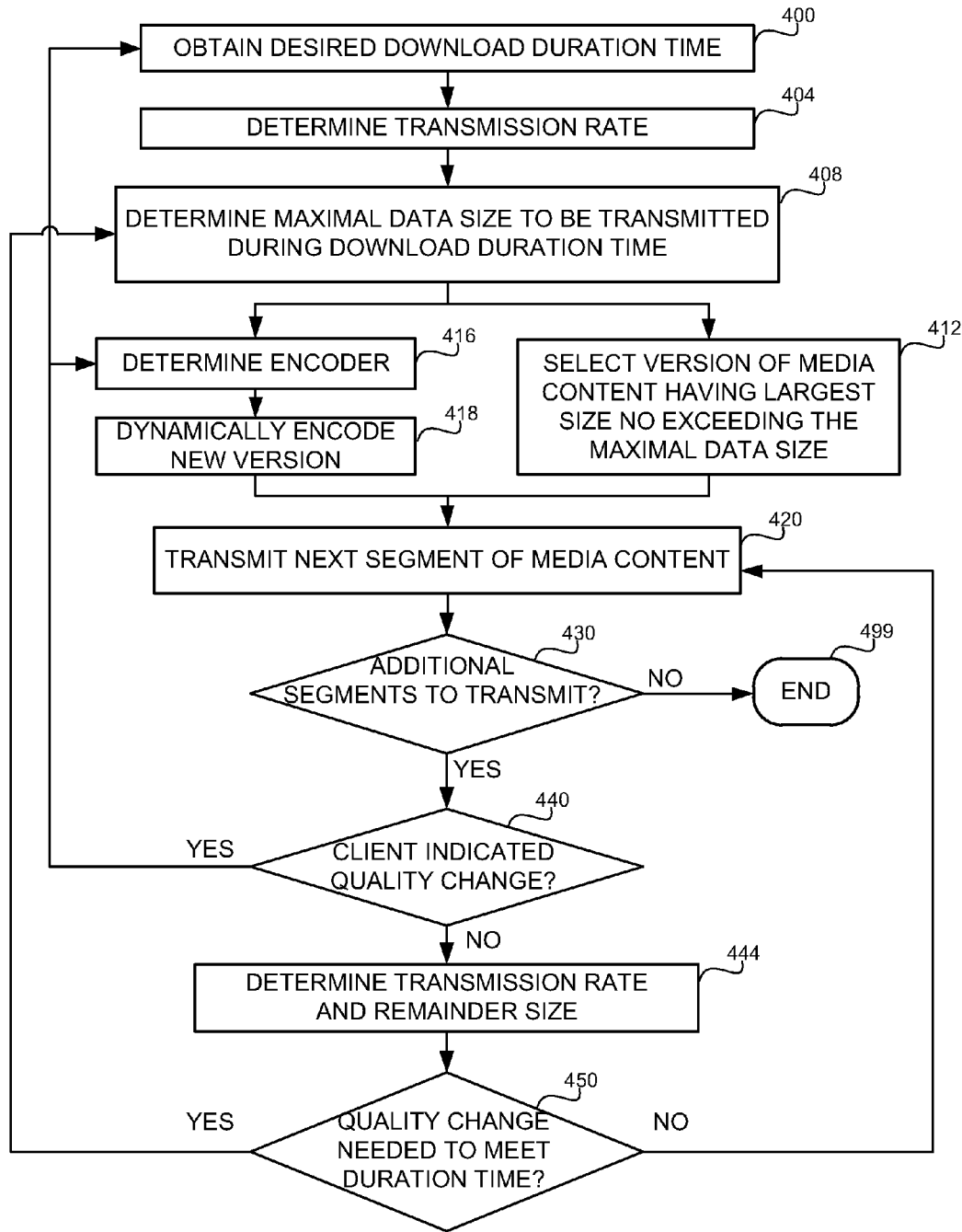
FIG. 4 shows a flowchart diagram of a method for transmitting media content, in accordance with some exemplary embodiments of the disclosed subject matter.

Referring now to FIG. 4 showing a flowchart diagram of a method for transmitting media content, in accordance with some exemplary embodiments of the disclosed subject matter. The method of FIG. 4 may be performed by a CDN, or other computerized device serving media content over a computerized network.

In step 400, a desired download duration time may be obtained. The duration time may be obtained from a client based on a user selection using an input component, such as 218.

In step 404, a transmission rate to the client may be determined.

In step 408, a maximal data size to be transmitted during download duration time may be computed. The maximal data size may be computed, for example, by multiplying the transmission rate per time unit with the number of time units comprised by the download duration time. For example, a transmission rate of 10 Mb/sec in 2 minutes may be sufficient to transmit 10×(2×60)=1200 Mb of data.

A version to be sent to the client may be determined. In step 412, the version may be selected from a set of pre-prepared versions. In some exemplary embodiments, assuming a maximal data size of 1200 Mb is computed, and assuming there are several possible versions: version 1 of size 800 Mb, version 2 of size 1100 Mb, and version 3 of size 1300 Mb, the version having the largest size that does not exceed maximal data size (1200 Mb) may be selected, and in this case—version 2.

Alternatively, in step 416 an encoder may be selected. The encoder may be selected from a set of possible encoders, each associated with a different lossiness level. In some exemplary embodiments, the same encoder may be provided with a parameter, such as bit rate, thereby providing different possible lossiness level and therefore may be viewed as different encoders. Based on an original size of the media content (i.e., without compression) and compression rate, an encoder that is operative to encode the media content to a data stream of small enough size to be transmitted within the download duration time may be selected. For example, assuming again possible data to be transferred in download duration time is 1200 Mb. Assuming original media content is of size 2000 Mb, and that there are different encoders each associated with a reduction in size of a different portion: 10% (i.e., to 1800 Mb), 30% (i.e., to 1400 Mb), 50% (i.e., to 1000 Mb) and 75% (i.e., to 500 Mb), encoder operative to gain reduction of 30% may be selected. It will be noted that there may be a larger or a smaller number of encoders. Optionally, there may be sufficient encoders to enable providing substantially any desired size above a minimal threshold. In some exemplary embodiments, the original media content size may be a size of uncompressed media content or of media content compressed using a lossless compression. Additionally or alternatively, the original media content size may be the size of the media content at the best available quality.

In step 418, the encoder selected in step 416 may be utilized to encode the media content. In some exemplary embodiments, an on-demand encoding of the new version may be performed. In some exemplary embodiments, the new version may be utilized for transmitting to the client and may optionally be dropped afterwards. In some exemplary embodiments, each segment of the version may be dropped after it is transmitted to the client.

In step 420, transmittal of media content to client may commence. In some exemplary embodiments, the media content may be segmented into segments, such as of predetermined length (e.g., 5 seconds). Each segment may be sent separately, and optionally may have different quality. In case a portion of the media content was already transmitted next segment to be transmitted (i.e., next consecutive segment for streaming or any segment that was not yet transmitted for non-streaming) may be transmitted.

If all segments were transmitted (430), the method may end (499). Otherwise, a determination may be made in step 440. If a quality change was indicated by the client, the method may change the version accordingly. If the quality change indicated is a change of download duration time (e.g., using input component 218, FF button 212, SM button 214), steps 400-418 may be performed again before transmission of next segment in step 420. If the quality change indicated is a change in quality was to a predetermined quality (e.g., using QCC 220), the desired version may be selected (not shown) and the next segment may be transmitted in step 420.

In step 444, a current transmission rate may be determined. Optionally, the current transmission rate may be the last transmission rate that was computed when sending the segment in step 420. Additionally or alternatively, a remainder size to be transmitted may be computed (e.g., additional 1000 Mb to be transmitted remain).

In step 450, it may be determined whether or not a quality change is required to meet the duration time. If a quality change is required, steps 408-418 may be performed to determine a new version. Otherwise, the next segment may be sent using the same version as before. In some exemplary embodiments, a quality change is needed if the time required for sending the reminder in the transmission rate (as determined in step 444) is more than remaining time given the desired download duration time. Thus, a reduced quality may be utilized instead. Additionally or alternatively, in case there is sufficient time, a better version may be sent. For example, in case of a remainder of 100 Mb and of transmission rate of 1 Mb/sec, and remaining time of 500 seconds, a better version of the remainder may be transmitted instead, such as a version of size of up to 500 Mb.

Figure 5:
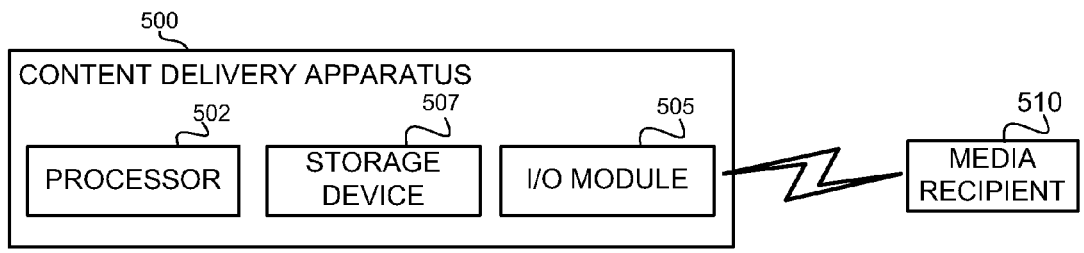
FIG. 5 shows a block diagram of an apparatus for transmitting media content, in accordance with some exemplary embodiments of the disclosed subject matter.

Referring now to FIG. 5 showing a block diagram of an apparatus for transmitting media content, in accordance with some exemplary embodiments of the disclosed subject matter. A content delivery apparatus 500, such as CDN 110, may be operative to perform a method such as depicted in FIG. 4.

Apparatus 500 may comprise a processor 502. Processor 502 may be a Central Processing Unit (CPU), a microprocessor, an electronic circuit, an Integrated Circuit (IC) or the like. Alternatively, apparatus 500 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 502 may be utilized to perform computations required by apparatus 500 or any of it subcomponents.

Apparatus 500 may comprise an Input/Output (I/O) module 505, such as useful for communicating over computerized network 120 with media recipient 510, such as clients 122, 124, 126.

Apparatus 500 may comprise one or more storage devices such as storage device 307. Storage device 507 may be persistent or volatile. For example, storage device 507 can be a Flash disk, a Random Access Memory (RAM), a memory chip, an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. In some exemplary embodiments, storage device 507 may retain program code operative to cause processor 502 to perform acts associated with any of the steps shown in FIG. 4 above. In some exemplary embodiments, original media content and/or pre-prepared versions of the media content may be retained in the storage device 507 and transmitted to the media recipient 510 by the apparatus 500.

Figure 6:
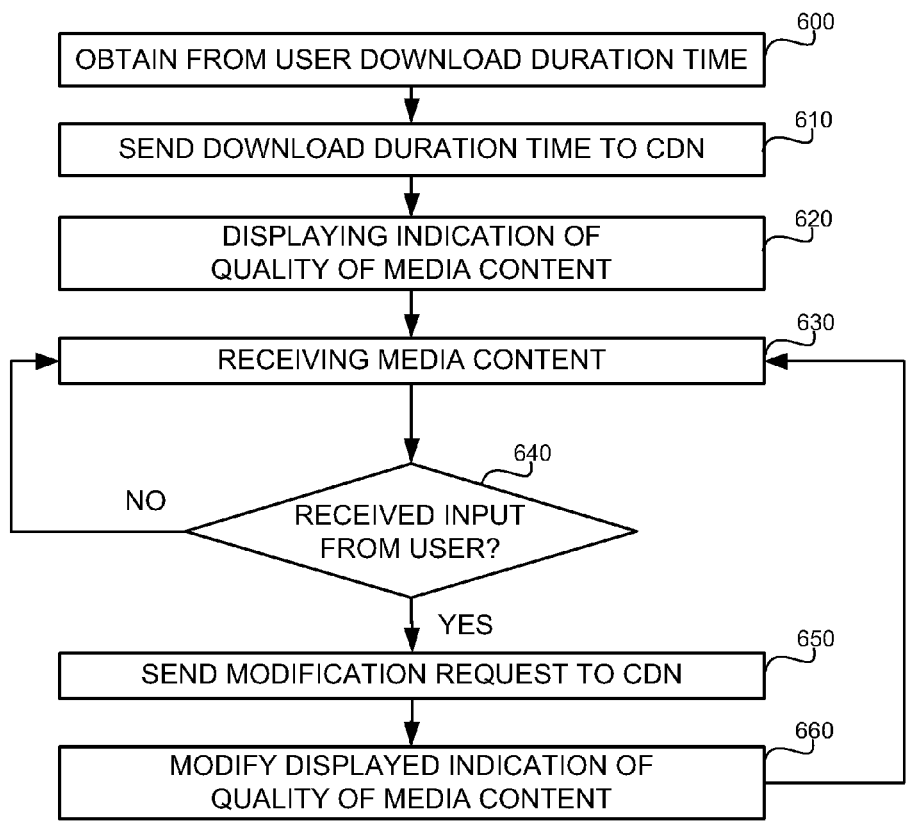
FIG. 6 shows a flow chart diagram of a method performed by a client receiving content, in accordance with some exemplary embodiments of the disclosed subject matter.

Referring now to FIG. 6 showing a flow chart diagram of a method performed by a client receiving content, in accordance with some exemplary embodiments of the disclosed subject matter.

In step 600, desired download duration time may be obtained from a user, such as using input component, such as 218.

In step 610, the download duration time may be sent to a computerized device operative to transmit the media content. The computerized device may perform a process similar to that depicted in FIG. 4. For simplicity, the device is referred to as CDN.

In step 620, an indication of quality of media content may be displayed. The indication may be displayed using QCC, such as 220. The quality may be computed by the client, may be obtained from the CDN after the CDN determines a version to be transmitted, or may be based on a rule of thumb, such as based on a ratio between duration of media content and size of the version.

In step 630, the media content may be received from the CDN. The media content may be received segment by segment.

If during download of the media content a user provides an input (640), step 650 may be performed. The user may interact with a component such as FF button 212, SM button 214, input component 218, QCC 220 or the like. In step 650, a modification request may be transmitted to the CDN. The request may be to modify download duration time (e.g. to change it by a time unit; to change it to a new download duration time; or the like), to modify the quality, or the like.

In step 660, the displayed indication of quality may be modified accordingly to the modification request of step 650.

Next segment to be downloaded may be downloaded in step 630, where the segment may be of a version in accordance with the modification request.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:
1. A computer-implemented method comprising:
  obtaining a download duration time from a client with respect to a media content, the download duration time defining a time by which download of the media content by the client is to be completed;

determining a quality of the media content based on the download duration time to be provided within the download duration time;

transmitting to the client a version of the media content having the quality, wherein during said transmitting, monitoring a remaining download duration time;

modifying the quality based on the remaining download duration time; and continuing transmission to the client of the media content by transmitting a second version of the media content having the modified quality, wherein the transmission is completed by the time defined by the download duration time.

2. The computer-implemented method of claim 1 further comprising, in response to said determining the quality, encoding the media content thereby providing the version of the media having the quality.

3. The computer-implemented method of claim 1, wherein said determining the quality comprises selecting the version from a predetermined set of versions, wherein said selecting comprises:

determining a transmission rate to the client;

computing maximal data capacity to be transferred in the download duration time given the transmission rate;

selecting the version from the predetermined set of versions, wherein the version having largest size which does not exceed the maximal data capacity.

4. The computer-implemented method of claim 1, wherein said transmitting comprises transmitting the version to the client in a transmission method; wherein the transmission method is selected from the group consisting of:

streaming transmission of the version, and transmitting a file comprising the version.

5. The computer-implemented method of claim 1 further comprising identifying a change of transmission rate; and in response to the change of transmission rate switching the transmitted version to a second version having a second quality, so as to complete transmittal within the download duration time.

6. The computer-implemented method of claim 5, wherein the change of transmission rate is a reduction in transmission speed, and wherein the second quality is of reduced quality than the determined quality.

7. The computer-implemented method of claim 5, wherein the change of transmission rate is an increase in transmission speed, and wherein the second quality is of an improved quality than the determined quality.

8. The computer-implemented method of claim 5, wherein said switching the transmitted version comprises:

determining the second quality of the media content so as to be provided with the download duration time given the change of transmission rate; and having a first portion of the media content transmitted in the version, transmitting a second portion of the media content using the second version.

9. The computer-implemented method of claim 5 further comprises continuously monitoring transmission rate and modifying quality of transmitted version, thereby transmitting the media content in the download duration time.

10. The computer-implemented method of claim 1 further comprises:

during said transmitting, receiving from the client an indication to modify transmission time; and switching the transmitted version to a second version having a second quality, so as to comply with the indication.

11. The computer-implemented method of claim 10, wherein the indication is selected from the group consisting of:

an indication to reduce transmission time;

an indication to increase transmission time; and a modified download duration time.

12. The computer-implemented method of claim 10, wherein the indication from the client is responsive to a notification from a user of the client, wherein the notification is associated with a modification of a communication link of the client.

13. The computer-implemented method of claim 12, wherein the modification of the communication link is a change in download speed to the client.

14. The computer-implemented method of claim 12, wherein the modification of the communication link is switching from a first network connection to a second network connection.

15. The computer-implemented method of claim 14, wherein either the first or second network connection is a cellular network connection.

16. The computer-implemented method of claim 14, wherein either the first or second network connection is associated with higher costs of downloading data.

17. An apparatus, the apparatus comprising:

a processing unit adapted to:

obtain a download duration time from a client with respect to a media content, the download duration time defining a time by which download of the media content by the client is to be completed;

determine a quality of the media content based on the download duration time to be provided within the download duration time;

transmit to the client a version of the media content having the quality, wherein during the transmission, monitor a remaining download duration time;

modify the quality based on the remaining download duration time; and continue transmission to the client of the media content by transmitting a second version of the media content having the modified quality, wherein the transmission is completed by the time defined by the download duration time.

18. A computer program product comprising program code stored on a non-transitory computer readable medium, which program code, when executed by a processor, cause the processor to perform the steps of:

obtaining a download duration time from a client with respect to a media content, the download duration time defining a time by which download of the media content by the client is to be completed;

determining a quality of the media content based on the download duration time to be provided within the download duration time;

transmitting to the client a version of the media content having the quality, wherein during said transmitting, monitoring a remaining download duration time;

modifying the quality based on the remaining download duration time; and continuing transmission to the client of the media content by transmitting a second version of the media content having the modified quality, wherein the transmission is completed by the time defined by the download duration time.

* * * * *